United States Patent
Kela et al.

(10) Patent No.: US 11,129,192 B2
(45) Date of Patent: Sep. 21, 2021

(54) CLIENT DEVICE, NETWORK NODE, AND METHODS THEREOF FOR PREDICTING USER-EXPERIENCED SIGNAL-TO-INTERFERENCE-PLUS-NOISE RATIO

(71) Applicant: Huawei Technologies Co., Ltd., Shenzhen (CN)

(72) Inventors: Petteri Kela, Helsinki (FI); Mario Costa, Helsinki (FI); George Koudouridis, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 16/701,353

(22) Filed: Dec. 3, 2019

(65) Prior Publication Data

US 2020/0107366 A1    Apr. 2, 2020

Related U.S. Application Data (63) Continuation of application No. PCT/EP2017/063748, filed on Jun. 7, 2017.

(51) Int. Cl.
*H04W 74/08* (2009.01)
*H04B 17/336* (2015.01)
(Continued)

(52) U.S. Cl.
CPC ...... *H04W 74/0808* (2013.01); *H04B 17/336* (2015.01); *H04W 28/0278* (2013.01); *H04W 72/1263* (2013.01); *H04W 72/14* (2013.01)

(58) Field of Classification Search
CPC ......... H04W 74/0808; H04W 28/0278; H04W 72/1263; H04W 72/14; H04B 17/336; H04L 1/00; H04L 1/0026
See application file for complete search history.

(56) References Cited

U.S. PATENT DOCUMENTS 5,483,669 A  *  1/1996  Barnett ........... H04W 36/00837
                                                    455/437
9,124,234 B1 *  9/2015  Petrovic ............... H03G 3/3052
(Continued)

FOREIGN PATENT DOCUMENTS

| CN | 103179619 A | 6/2013 |
|---|---|---|
| CN | 105745985 B | 11/2019 |

(Continued)

OTHER PUBLICATIONS

Kela et al., "Location Based Beamforming in 5G Ultra-Dense Networks," pp. 1-7, Institute of Electrical and Electronics Engineers, New York, New York (2016).

*Primary Examiner* — Harry H Kim (74) *Attorney, Agent, or Firm* — Leydig, Voit & Mayer, Ltd.

(57) ABSTRACT

A client device is configured to receive an indication of a first network SINR for a first data transmission from a network node, and to derive the first network SINR based on the indication of a first network SINR. The client device is further configured to estimate a SINR adjustment for a second data transmission from the network node, and to compute a SINR difference value between the first network SINR and the SINR adjustment. Furthermore, the client device is configured to transmit at least one first control message having an indication of the SINR adjustment to the network node if the SINR difference value is larger than a threshold value.

20 Claims, 7 Drawing Sheets

(51) Int. Cl.
*H04W 28/02* (2009.01)
*H04W 72/12* (2009.01)
*H04W 72/14* (2009.01)
*H04L 1/00* (2006.01)

(56) References Cited

U.S. PATENT DOCUMENTS

| | | | |
|---|---|---|---|
| 9,237,527 B2* | 1/2016 | Qiang | H04W 52/146 |
| 10,524,289 B2* | 12/2019 | Adachi | H04L 5/0007 |
| 2012/0263164 A1* | 10/2012 | Soriaga | H04W 52/325 |
| | | | 370/345 |
| 2013/0039198 A1* | 2/2013 | Isojima | H04L 1/1861 |
| | | | 370/252 |
| 2013/0107731 A1* | 5/2013 | Hu | H04L 1/0035 |
| | | | 370/252 |
| 2015/0016402 A1 | 1/2015 | Wager et al. | |
| 2015/0215069 A1* | 7/2015 | Lin | H04L 1/0035 |
| | | | 370/329 |
| 2017/0013641 A1 | 1/2017 | Patel et al. | |
| 2017/0257184 A1* | 9/2017 | Stirling-Gallacher | |
| | | | H04W 52/241 |
| 2018/0124799 A1* | 5/2018 | Li | H04W 72/085 |
| 2018/0254788 A1* | 9/2018 | Petrovic | H03G 3/3078 |
| 2019/0181969 A1* | 6/2019 | Zhang | H04B 17/336 |

FOREIGN PATENT DOCUMENTS

| | | | |
|---|---|---|---|
| WO | 2006076697 A2 | 7/2006 | |
| WO | 2008003087 A2 | 1/2008 | |

\* cited by examiner

CLIENT DEVICE, NETWORK NODE, AND METHODS THEREOF FOR PREDICTING USER-EXPERIENCED SIGNAL-TO-INTERFERENCE-PLUS-NOISE RATIO

CROSS-REFERENCE TO RELATED APPLICATIONS

This application is a continuation of International Application No. PCT/EP2017/063748, filed on Jun. 7, 2017, the disclosure of which is hereby incorporated by reference in its entirety.

TECHNICAL FIELD

The invention relates to a client device and a network node for predicting user-experienced signal-to-interference-plus-noise ratio (SINR). Furthermore, the invention also relates to corresponding methods and a computer program.

BACKGROUND

Link adaptation in wireless communication systems is based on predictions of user-experienced signal-to-interference-plus-noise ratio (SINR) before data transmission. The user-experienced SINR is predicted by the network and used by the network to assign an optimal modulation and coding scheme (MCS) for the data transmission.

In wireless communication systems using frequency-division duplexing (FDD), MCS is completely dependent on channel status information (CSI) reporting. The CSI report can include, e.g., channel quality indicator (CQI), rank indicator (RI), precoding matrix indicator (PMI), and precoding type indicator (PTI).

In wireless communication systems using time-division duplexing (TDD), where both uplink (UL) and downlink (DL) use the same frequency resources, UL sounding reference signals (SRSs) can be used for predicting the DL SINR by exploiting channel reciprocity. Using UL SRS is especially beneficial for multiuser multiple-input multiple-output (MU-MIMO) systems, where large antenna arrays are utilized for beamforming and spatial division multiplexing (SDM). CSI reporting for each transmit antenna element separately would increase the control signalling overhead significantly. Hence, it is not considered in practice. Usually, the well-known outer loop link adaptation (OLLA) algorithm or similar learning algorithms are used to predict the user-experienced SINR.

In ultra-dense networks (UDNs), where a central controller is responsible for the scheduling decisions, the interfering precoders of the transmission/reception points (TRPs) closest to the serving TRP are usually well known. Thus, facilitating the prediction of the user-experienced SINR and subsequent choice of the MCS. However, in case the user employs receiver beamforming, it is extremely challenging for the network to estimate the user-experienced SINR for a data transmission. This is because the network does not typically know the receiver beamforming weight vectors employed by the user. Furthermore, the OLLA algorithm does not work well if transmission beams (precoders) are formed dynamically on every transmission time interval (TTI) for mobile users. This is due to changing scheduling decisions causing varying radiation patterns of interferers every TTI supplemented with rather significant channel aging. The OLLA algorithm cannot adapt to rapid changes in interference levels and will therefore lag behind.

There are additional challenges in predicting user-experienced SINR for UDNs. For example, even though TRPs may cooperate and share their estimated interference leakage towards users, the accuracy of CSI estimation deteriorates with distance between users and TRPs. This is due to pilot contamination and limited transmit power of the client devices. Furthermore, changes of the serving TRP are rather common for mobile users in UDNs. When the serving TRP changes, it is common to have a larger gap in user-experienced SINR than in normal operation, which e.g. the OLLA algorithm cannot learn as rapidly as required.

Periodic and aperiodic CSI reporting can improve the SINR prediction, but results in significantly increased signalling overhead. Aperiodic CSI reporting needs to be scheduled and allocated to users with DL control signalling. This causes extra overhead, as well as longer latency. Periodic CSI reporting needs to be configured with a specific periodicity. However, the required periodicity depends on user activity patterns and channel aging. Hence, periodic CSI reporting is not suitable in scenarios with bursty traffic and interference.

SUMMARY

The present application provides solutions that mitigates or solves the drawbacks and problems of conventional solutions for predicting user-experienced signal-to-interference-plus-noise ratio (SINR).

According to a first aspect of the present application, the above mentioned and other improvements are achieved with a client device for a wireless communication system, the client device being configured to:

receive an indication of a first network SINR for a first data transmission from a network node;

derive the first network SINR based on the indication of a first network SINR;

estimate a SINR adjustment for a second data transmission from the network node;

compute a SINR difference value between the first network SINR and the SINR adjustment; and transmit at least one first control message having an indication of the SINR adjustment to the network node if the SINR difference value is larger than a threshold value, where the threshold value is a minimum difference between the first network SINR and the SINR adjustment.

It should be understood herein that the transmission of at least one first control message means that one or more first control messages are sent by the client device. The content of the one or more first control messages are according to implementation forms of the present application.

A client device according to the first aspect provides a number of advantages over conventional solutions. An advantage of the present client device is that it allows for a much quicker adaptation to the rapid radio channel changes, such as variations in interference. Consequently, decreased data transmission errors and improved user throughput and improved service levels are achieved in the system.

In an implementation form of a client device according to the first aspect, the client device is further configured to:

receive the first data transmission from the network node;

determine a decoding process outcome for the first data transmission based on the indication of the first network SINR; and transmit the first control message if the SINR difference value is larger than the threshold value and if the decoding process outcome is a decoding error or a decoding success.

An advantage with this implementation form is that it allows for a quick adaptation to channel changes, and therefore, reduces data transmission errors, and improves user throughput and service levels. This is due to the decoding process outcome mechanism, which implicitly reflects the channel quality.

In an implementation form of a client device according to the first aspect, the client device is further configured to transmit the first control message in a contention based access channel.

This implementation form allows sending control messages instantly without dedicated control channel allocation. This reduces latency and improves usage of radio channel resources. Furthermore, it enables quicker adaptation to channel changes, and therefore, reduces data transmission errors, and improves user throughput and service levels.

In an implementation form of a client device according to the first aspect, the client device is further configured to:

receive a second control message from the network node, where the second control message has a channel access configuration for the contention based access channel; and transmit the first control message in the contention based access channel according to the channel access configuration.

An advantage with this implementation form is that it regulates the access in terms of channel access configuration to the control channel so that congestion among users and control information delays may be reduced.

In an implementation form of a client device according to the first aspect, the second control message further has a valid access time period for the contention based access channel, and the client device is further configured to access the contention based access channel during the valid access time period.

An advantage with this implementation form is that it regulates the access to the control channel so that congestion among users and control information delays are reduced. Further, the valid access time period provides a scheduling mechanism for the access to the contention based access channel.

In an implementation form of a client device according to the first aspect, the second control message further has a priority level, and the client device is further configured to use the priority level in a back-off collision scheme when accessing the contention based access channel.

An advantage with this implementation form is that it reduces collisions in the contention based access channel.

In an implementation form of a client device according to the first aspect, the second control message further includes the threshold value.

An advantage with this implementation form is that it provides a mechanism for the network to control the adaptation of network SINRs for subsequent data transmissions. By determining the value of the threshold and transmitting this value to the client device, the network can control both the periodicity (how often the threshold value is transmitted to the client device) and the granularity (the value of the threshold value) of the network SINR adaptation.

In an implementation form of a client device according to the first aspect, the client device is further configured to transmit payload data to the network node in the contention based access channel.

An advantage with this implementation form is that it reduces data transmission delays, and improves user throughput and service levels.

In an implementation form of a client device according to the first aspect, the client device is further configured to:

determine a transmission buffer status report of the client device; and transmit the first control message further comprising the transmission buffer status report.

An advantage with this implementation form is that the network with up-to-date transmission buffer status information for the client device can timely schedule the data transmissions of the client device and reduce latency. Further, by adding the transmission buffer status report in the first control message effective control signaling is provided thereby reducing overhead in the system.

In an implementation form of a client device according to the first aspect, the client device is further configured to:

determine a scheduling request for the client device; and transmit the first control message further comprising the scheduling request.

An advantage with this implementation form is that it with the transmission of the scheduling request the need for uplink radio resource allocation is signalled to the network. Further, by adding the scheduling request in the first control message effective control signaling is provided thereby reducing overhead in the system.

According to a second aspect of the invention, the above mentioned and other advantages are achieved with a network node for a wireless communication system, the network node being configured to:

estimate a first network SINR for a first data transmission to a client device;

perform the first data transmission to the client device using the first network SINR;

receive a first control message from the client device, where the first control message comprises an indication of a SINR adjustment; and estimate a second network SINR for a second data transmission to the client device based on the indication of the SINR adjustment.

An advantage of the present network node is that it allows for a much quicker adaptation to the rapid radio channel changes, such as variations in interference. Consequently, decreased data transmission errors, and improved user throughput, and improved service levels are achieved in the system.

In an implementation form of a network node according to the second aspect, the network node is further configured to:

determine a channel access configuration for a contention based access channel;

transmit a second control message to the client device, where the second control message includes the channel access configuration for the contention based access channel; and receive the first control message in the contention based access channel according to the channel access configuration.

This implementation form allows sending control messages instantly without dedicated control channel allocation. This improves latency and usage of radio channel resources. Hence, quicker adaptation to channel changes and therefore reduces data transmission errors, and improves user throughput and service.

In an implementation form of a network node according to the second aspect, the network node is further configured to broadcast the second control message to a plurality of client devices.

An advantage with this implementation form is that it regulates the access to the control channel so as congestion among users and control information delays are reduced.

This allows for a quick adaptation to channel changes and overall reduces data transmission errors, and improves user throughput and service levels.

In an implementation form of a network node according to the second aspect, the network node is further configured to:

determine a valid access time period for the contention based access channel; and transmit the second control message having the valid access time period.

An advantage with this implementation form is that it regulates the access to the control channel so that congestion among users and control information delays are reduced. Further, the valid access time period provides a scheduling mechanism for the access to the contention based access channel.

In an implementation form of a network node according to the second aspect, the network node is further configured to:

determine a priority level for a back-off collision scheme; and transmit the second control message comprising the priority level.

An advantage with this implementation form is that it reduces collisions in the contention based access channel.

In an implementation form of a network node according to the second aspect, the network node is further configured to:

determine a threshold value indicating a minimum allowed difference between the first network SINR and the SINR adjustment; and transmit the second control message comprising the threshold value.

An advantage with this implementation form is that it provides a mechanism for the network to control the adaptation of network SINRs for subsequent data transmissions. By determining the value of the threshold and transmitting this value to the client device the network can control both the periodicity (how often the threshold value is transmitted to the client device) and the granularity (the value of the threshold value) of the network SINR adaptation.

In an implementation form of a network node according to the second aspect, the first control message further includes a transmission buffer status report of the client device, and the network node is further configured to determine the second data transmission based on the transmission buffer status report of the client device.

An advantage with this implementation form is that the network with up-to-date transmission buffer status information for the client device can timely schedule the data transmissions of the client device and reduce latency. Further, by adding the transmission buffer status report in the first control message effective control signaling is provided thereby reducing overhead in the system.

In an implementation form of a network node according to the second aspect, the first control message further includes a scheduling request for the client device, and the network node is further configured to determine the second data transmission based on the scheduling request for the client device.

An advantage with this implementation form is that with the transmission of the scheduling request the need for uplink radio resource allocation is signalled to the network. Further, by adding the scheduling request in the first control message effective control signaling is provided thereby reducing overhead in the system.

In an implementation form of a client device according to the first aspect or an implementation form of a network node according to the second aspect, the indication of the SINR adjustment is any in the group comprising a SINR value, a SINR offset value, a MCS index, and a MCS offset value.

These mentioned indications of the SINR adjustment provide different suitable options for the systems to decide on how the SINR adjustment representation should be performed.

According to a third aspect of the present application, the above mentioned and other advantages are achieved with a method for a client device, the method including:

receiving an indication of a first network SINR for a first data transmission from a network node;

deriving the first network SINR based on the indication of a first network SINR;

estimating a SINR adjustment for a second data transmission from the network node;

computing a SINR difference value between the first network SINR and the SINR adjustment; and transmitting at least one first control message having an indication of the SINR adjustment to the network node if the SINR difference value is larger than a threshold value, where the threshold value is a minimum difference between the first network SINR and the SINR adjustment.

In an implementation form of a method according to the third aspect, the method further includes:

receiving the first data transmission from the network node;

determining a decoding process outcome for the first data transmission based on the indication of the first network SINR; and transmitting the first control message if the SINR difference value is larger than the threshold value and if the decoding process outcome is a decoding error or a decoding success.

In an implementation form of a method according to the third aspect, the method further includes transmitting the first control message in a contention based access channel.

In an implementation form of a method according to the third aspect, the method further includes:

receiving a second control message from the network node, where the second control message has a channel access configuration for the contention based access channel; and transmitting the first control message in the contention based access channel according to the channel access configuration.

In an implementation form of a method according to the third aspect, the second control message further has a valid access time period for the contention based access channel, and the method further includes accessing the contention based access channel during the valid access time period.

In an implementation form of a method according to the third aspect, the second control message further has a priority level, and the method further includes using the priority level in a back-off collision scheme when accessing the contention based access channel.

In an implementation form of a method according to the third aspect, the second control message further has the threshold value.

In an implementation form of a method according to the third aspect, the method further includes transmitting payload data to the network node in the contention based access channel.

In an implementation form of a method according to the third aspect, the method further includes:

determining a transmission buffer status report of the client device; and transmitting the first control message further including the transmission buffer status report.

In an implementation form of a method according to the third aspect, the method further includes:

determining a scheduling request for the client device; and transmitting the first control message further including the scheduling request.

The advantages of the methods according to the third aspect are the same as those for the corresponding device claims according to the first aspect.

According to a fourth aspect of the present application, the above mentioned and other advantages are achieved with a method for a network node, the method including:

estimating a first network SINR for a first data transmission to a client device;

performing the first data transmission to the client device using the first network SINR;

receiving a first control message from the client device, where the first control message has an indication of a SINR adjustment; and estimating a second network SINR for a second data transmission to the client device based on the indication of the SINR adjustment.

In an implementation form of a method according to the fourth aspect, the method further includes:

determining a channel access configuration for a contention based access channel;

transmitting a second control message to the client device, where the second control message has the channel access configuration for the contention based access channel; and receiving the first control message in the contention based access channel according to the channel access configuration.

In an implementation form of a method according to the fourth aspect, the method further includes broadcasting the second control message to a plurality of client devices.

In an implementation form of a method according to the fourth aspect, the method further includes:

determining a valid access time period for the contention based access channel; and transmitting the second control message having the valid access time period.

In an implementation form of a method according to the fourth aspect, the method further includes:

determining a priority level for a back-off collision scheme; and transmitting the second control message comprising the priority level.

In an implementation form of a method according to the fourth aspect, the method further includes:

determining a threshold value indicating a minimum allowed difference between the first network SINR and the SINR adjustment; and transmitting the second control message comprising the threshold value.

In an implementation form of a method according to the fourth aspect, the first control message further includes a transmission buffer status report of the client device, and the method further includes determining the second data transmission based on the transmission buffer status report of the client device.

In an implementation form of a method according to the fourth aspect, the first control message further includes a scheduling request for the client device, and the method further includes determining the second data transmission based on the scheduling request for the client device.

The advantages of the methods according to the fourth aspect are the same as those for the corresponding network node claims according to the second aspect.

In an implementation form of a method according to the third or fourth aspect, the indication of the SINR adjustment is any in the group comprising a SINR value, a SINR offset value, a MCS index, and a MCS offset value.

The present application also provides a computer program, characterized in code means, which when run by processing means causes said processing means to execute any method according to the present invention. Further, the invention also relates to a computer program product including a computer readable medium and the above-mentioned computer program, where the computer program is included in the computer readable medium, and comprises of one or more from the group: ROM (Read-Only Memory), PROM (Programmable ROM), EPROM (Erasable PROM), Flash memory, EEPROM (Electrically EPROM), and a hard disk drive.

Further applications and advantages of the present application will be apparent from the following detailed description.

BRIEF DESCRIPTION OF THE DRAWINGS

The appended drawings are intended to clarify and explain exemplary embodiments of the present invention, in which.

DETAILED DESCRIPTION

Figure 1:
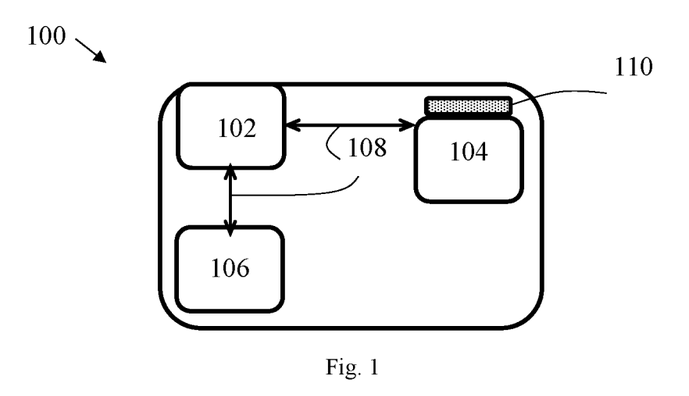
FIG. 1 shows a client device according to an exemplary embodiment of the invention.

FIG. 1 shows a client device 100 according to an exemplary embodiment of the invention. The client device 100 includes a processor 102 coupled to a transceiver 104 and a memory 106. The processor 102 is coupled to the transceiver 104 and the memory 106 by communication means 108 known in the art. The client device 100 is configured for wireless transmissions/communications in wireless communication systems. The wireless communication capability is provided with an antenna 110 coupled to the transceiver 104. In an embodiment, the processor 102 may be a dedicated processor for executing the methods according to the invention only. In some embodiments, the processor 102 may instead be shared with other processes within the client device 100 and perform additional processing. That the client device 100 is configured to perform certain actions should in this disclosure be understood to mean that the client device 100 includes suitable means, such as e.g. the processor 102, configured to perform said actions.

The client device 100 is configured to receive an indication of a first network SINR for a first data transmission DT1 (shown in FIG. 5) from a network node 300 (shown in FIG. 3) and derive the first network SINR based on the indication of a first network SINR. The client device 100 is further configured to estimate a SINR adjustment for a second data transmission DT2 (shown in FIG. 5) from the network node 300. The client device 100 is further configured to compute a SINR difference value between the first network SINR and the SINR adjustment. Furthermore, the client device 100 is configured to transmit at least one first control message CM1 including an indication of the SINR adjustment to the network node 300 if the SINR difference value is larger than a threshold value.

The client device 100 may obtain the threshold value in different ways. The threshold value may, e.g., be pre-configured in the client device 100 or received from the network. In addition, the threshold value may be service dependent and thereby dynamically changed depending on the service used by the client device 100. The different threshold values for the different services may, e.g., in one embodiment be pre-configured in the client device 100 or in one embodiment be received from the network. The threshold value is a minimum difference between the first network SINR and the SINR adjustment, which should initiate the transmission of the first control message CM1.

Figure 2:
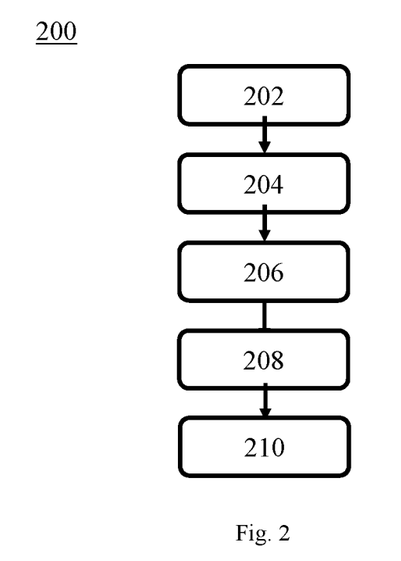
FIG. 2 shows a method according to an exemplary embodiment of the invention.

FIG. 2 shows a flow chart of a corresponding method 200, which may be executed in a client device 100, such as the one shown in FIG. 1. The method 200 includes receiving 202 an indication of a first network SINR for a first data transmission DT1 from a network node 300 and deriving 204 the first network SINR based on the indication of a first network SINR. The method 200 further includes estimating 206 a SINR adjustment for a second data transmission DT2 from the network node 300. The method 200 further includes computing 208 a SINR difference value between the first network SINR and the SINR adjustment. Furthermore, the method 200 includes transmitting 210 at least one first control message CM1 comprising an indication of the SINR adjustment to the network node 300 if the SINR difference value is larger than a threshold value. The threshold value is a minimum difference between the first network SINR and the SINR adjustment.

Figure 3:
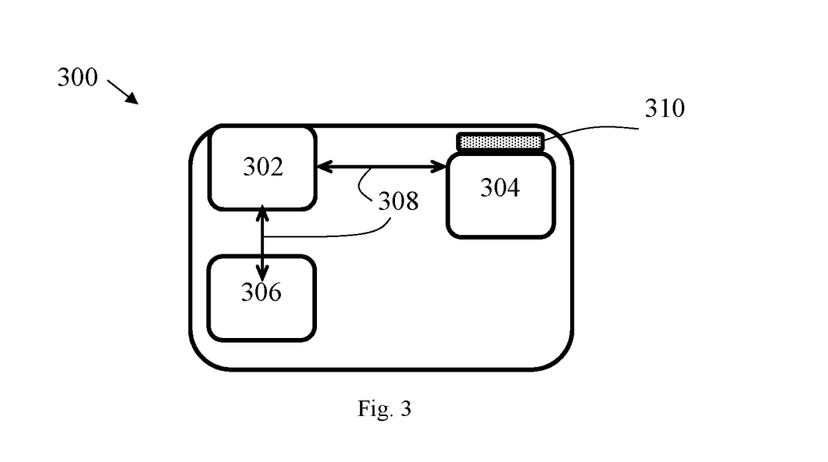
FIG. 3 shows a network node according to an exemplary embodiment of the invention.

FIG. 3 shows a network node 300 according to an exemplary embodiment of the invention. In the embodiment shown in FIG. 3, the network node 300 includes a processor 302, a transceiver 304, and a memory 306. The processor 302 is coupled to the transceiver 304 and the memory 306 by communication means 308 known in the art. The network node 300 further includes an antenna 310 coupled to the transceiver 302, which means that the network node 300 is configured for wireless transmissions/communications in a wireless communication system. In an embodiment, the processor 302 may be a dedicated processor for executing the methods according to the invention only. In some embodiments, the processor 302 may instead be shared with other processes within the network node 300 and perform additional processing. That the network node 300 configured to perform certain actions should in this disclosure be understood to mean that the network node 300 includes suitable means, such as e.g. the processor 302, configured to perform said actions.

The network node 300 is configured to estimate a first network SINR for a first data transmission DT1 to a client device 100. The network node 300 is further configured to perform the first data transmission DT1 to the client device 100 using the first network SINR. The network node 300 is further configured to receive a first control message CM1 from the client device 100. The first control message CM1 includes an indication of a SINR adjustment. Furthermore, the network node 300 is configured to estimate a second network SINR for a second data transmission DT2 to the client device 100 based on the indication of the SINR adjustment.

Figure 4:
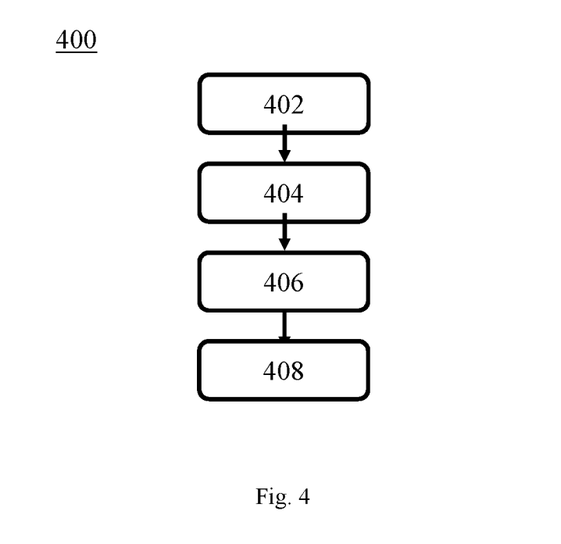
FIG. 4 shows another method according to an exemplary embodiment of the invention.

FIG. 4 shows a flow chart of a corresponding method 400, which may be executed in a network node 300, such as the one shown in FIG. 3. The method 400 includes estimating 402 a first network SINR for a first data transmission DT1 to a client device 100. The method 400 further includes performing 404 the first data transmission DT1 to the client device 100 using the first network SINR. The method 400 further includes receiving 406 a first control message CM1 from the client device 100. The first control message CM1 includes an indication of a SINR adjustment. Furthermore, the method 400 includes estimating 408 a second network SINR for a second data transmission DT2 to the client device 100 based on the indication of the SINR adjustment.

Figure 5:
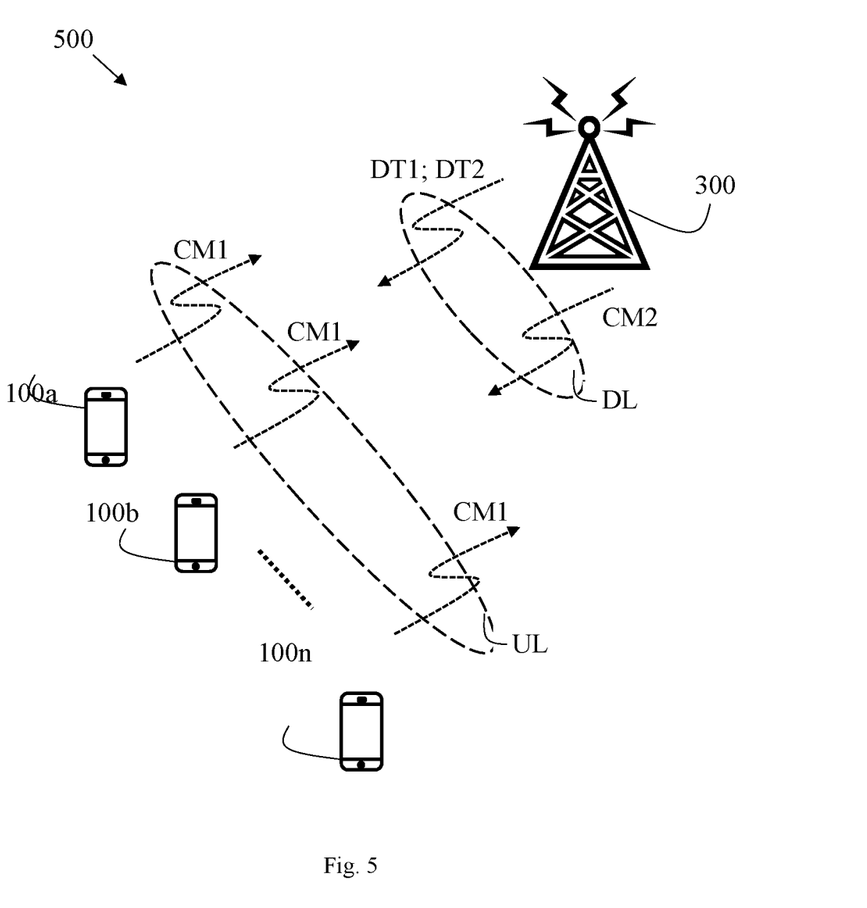
FIG. 5 shows a wireless communication system according to an exemplary embodiment of the invention.

FIG. 5 shows a wireless communication system 500 according to an exemplary embodiment. For simplicity, the wireless communication system 500 shown in FIG. 5 only includes one network node 300. However, the wireless communication system 500 may include any number of network nodes 300 without deviating from the scope of the invention. The wireless communication system 500 includes a plurality of client devices 100a, 100b, . . . , 100n and a network node 300 configured to operate in the wireless communication system 500. In the wireless communication system 500, the network node 300 as illustrated transmits data transmissions DT1; DT2 and control messages CM2 according to embodiments of the invention to the client devices 100a, 100b, . . . , 100n in DL. In UL, the client devices 100a, 100b, . . . , 100n as illustrated transmits control messages CM1s to the network node 300 according to the invention. FIG. 5 also illustrates the interworking between the network node 300 and the plurality of client devices 100a, 100b, . . . , 100n. In the following disclosure more details about the interworking between the network node 300 and the client devices 100a, 100b, . . . , 100n according to embodiments of the invention will be described.

Figure 6:
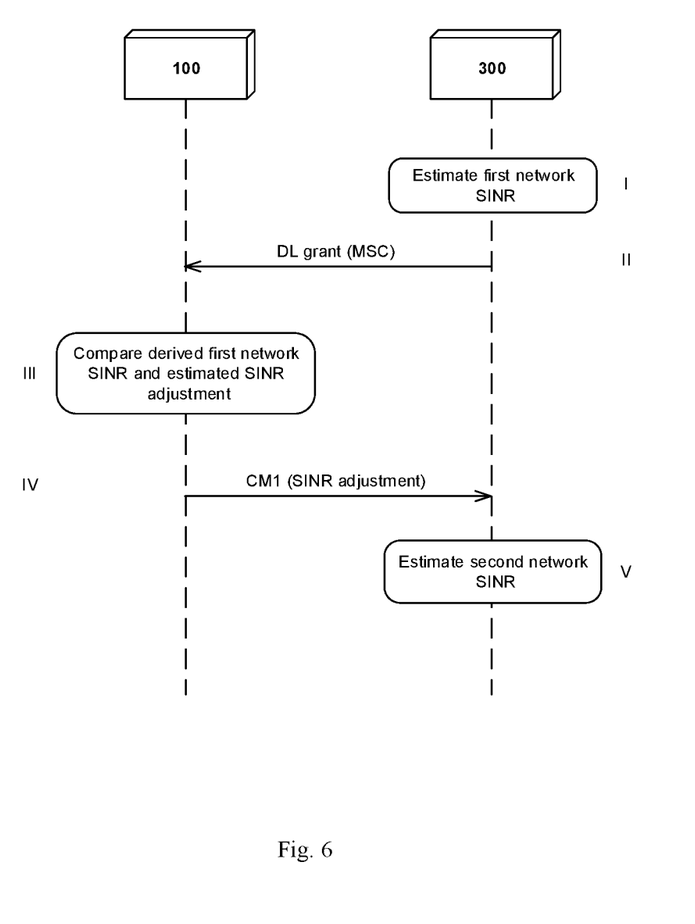
FIG. 6 shows a flow chart according to an exemplary embodiment of the invention.

FIG. 6 shows a flow chart of an exemplary embodiment of the invention. In step I in FIG. 6, the network node 300 estimates a first network SINR for a first data transmission DT1 to a client device 100 from the network node 300. The estimated first network SINR may be based, e.g., on uplink reference signals received from the client device 100 and may be adjusted with a SINR offset. The SINR offset may be updated constantly, e.g. with OLLA or other learning algorithms known in the art. The estimated first network SINR is used to select an adequate MCS for the first data transmission DT1. The selected MCS may serve as an indication of the first network SINR and is included in a DL grant transmitted from the network node 300 to the client device 100, which is illustrated in step II in FIG. 6. The client device 100 is thereby informed about the selected MCS, which is applicable for the first data transmission DT1 from the network node 300 that may follow. The received DL grant may also comprise parameters for receiving payload data, etc.

In step III in FIG. 6, the client device 100 derives the first network SINR based on the MCS received in the DL grant and compares the first network SINR with its own estimated SINR adjustment. The client device 100 may estimate the SINR adjustment based on DL reference signals sent by the network node 300 in one example. If the difference between the first network SINR and the SINR adjustment is larger than a threshold value, the client device 100 transmits a first control message CM1 to the network node 300, which is illustrated in step IV in FIG. 6. The client device 100 has obtained the threshold value, e.g. by pre-configuration or from the network node 300, as previously described. The first control message CM1 includes an indication of the SINR adjustment, and the first control message CM1 is transmitted during the next possible occasion for such transmission, as will be described below with reference to FIG. 8. The indication of the SINR adjustment may be any in the group including a SINR value, a SINR offset value, a MCS index, and a MCS offset value.

When the network node 300 receives the first control message CM1, it employs the received indication of the SINR adjustment to update the SINR offset and estimate a second network SINR for a second data transmission DT2 from the network node 300 to the client device 100, which is illustrated in step V in FIG. 6.

Figure 7:
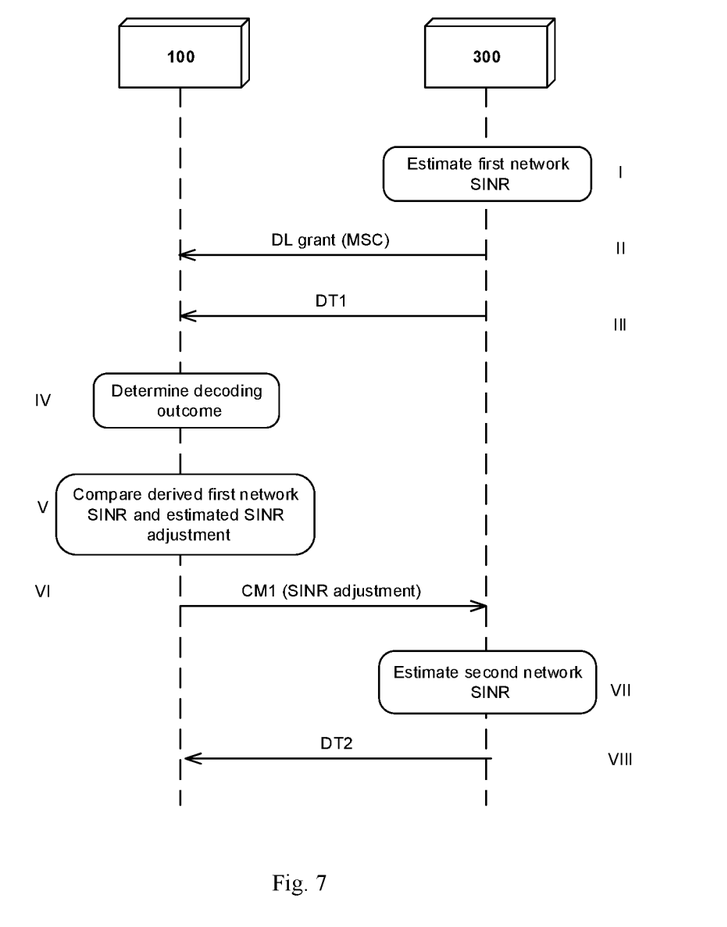
FIG. 7 shows a flow chart according to an exemplary embodiment of the invention.

FIG. 7 shows a flow chart of an exemplary embodiment of the invention in which a first data transmission DT1 is sent by the network node 300. Step I and II in FIG. 7 corresponds to step I and II in FIG. 6. Hence, in step I and II in FIG. 7 the network node 300 estimates a first network SINR and transmits a DL grant, including a MCS selected based on the first network SINR, to the client device 100. In step III in FIG. 7, the network node 300 send a first data transmission DT1 to the client device 100. When the client device 100 receives the first data transmission DT1 from the network node 300 it tries to decode the first data transmission DT1. An outcome of the decoding process for the first data transmission DT1 is determined based on the MCS, i.e. the indication of the first network SINR, which is illustrated in step IV in FIG. 7. The outcome of the decoding process may be either a decoding error or a decoding success.

Step V in FIG. 7 corresponds to step III in FIG. 6. Hence, in step V in FIG. 7 the client device 100 compares the derived first network SINR with its own estimated SINR adjustment. If the difference between the first network SINR and the SINR adjustment is larger than a threshold value, the client device 100 transmits a first control message CM1 to the network node 300, which is illustrated in step VI in FIG. 7. In the embodiment shown in FIG. 7, the client device 100 transmits the first control message CM1 if the SINR difference value is larger than the threshold value and if the decoding process outcome is a decoding error or a decoding success. Hence, two criterions are used in this embodiment, i.e. compare with the threshold value and the decoding process outcome. In an embodiment, if the outcome of the decoding process is a decoding error the indication of the SINR adjustment in the first control message CM1 indicates that a lower SINR or a MCS corresponding to the lower SINR should be used. On the other hand, if the outcome of the decoding process is a decoding success the indication of the SINR adjustment indicates that a higher SINR or a MCS corresponding to the higher SINR should be used.

When the network node 300 receives the first control message CM1 it employs the received indication of the SINR adjustment to update the SINR offset and estimate a second network SINR for a second data transmission DT2, which is illustrated in step VII in FIG. 7. In step VIII, the network node 300 transmits the second data transmission DT2 with a MCS selected based on the second network SINR.

In an exemplary embodiment of the invention, the client device 100 is configured to transmit the first control message CM1 in a contention based access channel (CBAC). In such an embodiment, the client device 100 may receive a channel access configuration for the contention based access channel CBAC from the network node 300. The channel access configuration includes parameters and/or information necessary for transmitting contention based UL control information in the contention based access channel CBAC. These parameters may, e.g., identify the contention based access channel CBAC, define a valid access period, and/or a priority level. The valid access period may define the period during which the client device 100 is allowed to access the contention based access channel CBAC. Hence, when the valid access period of granted access expires or if the network node 300 notifies the client device 100 that access grant is withdrawn, the client device 100 would have to receive a new channel access configuration with a new valid access period before accessing the contention based access channel CBAC again. The priority level may determine a back-off scheme for accessing the contention based access channel CBAC, i.e. would have the same function as a back-off timer known in the art. Different priority levels may e.g. be assigned to a first control message CM1 depending on the content of the first control message CM1, e.g. a first control message CM1 comprising an indication of an SINR adjustment may be assigned a higher priority level than a first control message CM1 comprising a scheduling request SR (described below with reference to FIG. 9). Client devices 100a, 100b, ..., 100n that have been granted access to the contention based access channel CBAC through the reception of the channel access configuration may at any time access the contention based access channel CBAC based on the backoff-scheme associated with the priority level of the content of the first control message CM1 to be transmitted. This allows the network node 300 to control the transmission of first control messages CM1s in the contention based access channel CBAC.

According to an embodiment, the network node 300 may be configured to determine a channel access configuration for a contention based access channel CBAC and transmit a second control message CM2 to the client device 100. The second control message CM2 has the channel access configuration for the contention based access channel CBAC. The client device 100 receives the second control message CM2, having the channel access configuration for the contention based access channel CBAC, from the network node 300. The client device 100 then transmits the first control message CM1 in the contention based access channel CBAC according to the channel access configuration and the network node 300 receives the first control message CM1 in the contention based access channel CBAC according to the channel access configuration.

According to an exemplary embodiment, the network node 300 is configured to broadcast the second control message CM2 to a plurality of client devices 100a, 100b, ..., 100n, e.g. periodically. This allows the network node 300 to e.g. spatially schedule the transmission of control information from the client devices 100a, 100b, ..., 100n. However, the network node 300 may, in some embodiments, instead transmit the second control message CM2 to the client device 100 using dedicated signaling addressed to the client device 100.

Figure 8:
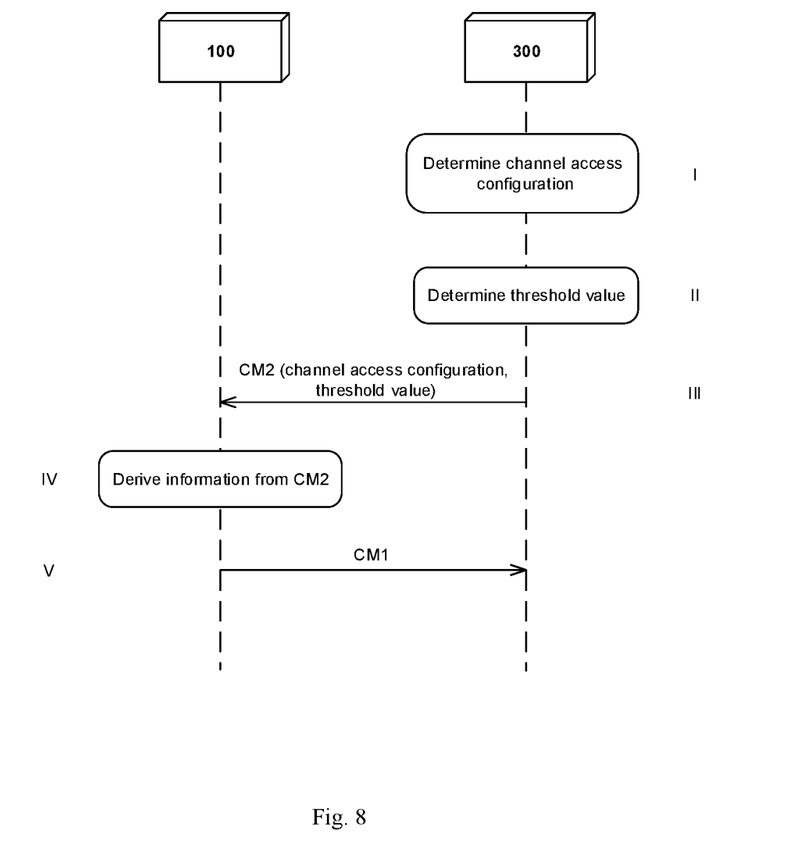
FIG. 8 shows a flow chart according to an exemplary embodiment of the invention.

FIG. 8 shows a flow chart of an exemplary embodiment where the network node 300 provides channel access configuration for the contention based access channel CBAC to the client device 100. In step I in FIG. 8, the network node 300 determines the channel access configuration. This step may include determining the previously described channel access configuration parameters, such as the contention based access channel CBAC identification, the valid access time period for the contention based access channel CBAC, and/or the priority level for a back-off collision scheme.

In II in FIG. 8, the network node 300 determines a threshold value indicating a minimum allowed difference between the first network SINR and the SINR adjustment.

The network node 300 then transmits the second control message CM2 to the client device 100, which is illustrated in step III in FIG. 8. The second control message CM2 comprises the determined channel access configuration, i.e. parameters such as the valid access time period for the contention based access channel CBAC and/or the priority level. In addition, the second control message CM2 may comprise the threshold value determined in step II. Alternatively, the second control message CM2 may comprise only the threshold value and no channel access configuration information.

In step IV in FIG. 8, the client device 100 derives the information including in the second control message CM2, and utilizes the derived information to determine when and how to transmit the first control message CM1. Hence, the client device 100 may e.g. transmit the first control message CM1 during the valid access time period derived from the second control message CM2, i.e. the client device 100 access the contention based access channel CBAC only during the valid access time period. In addition, the client device 100 may use the priority level derived from the second control message CM2 in a back-off collision scheme when accessing the contention based access channel CBAC.

In an embodiment, the contention based access channel CBAC, described above and used to transmit the first control message CM1, may also be used by the client device 100 to transmit payload data to the network node 300.

Figure 9:
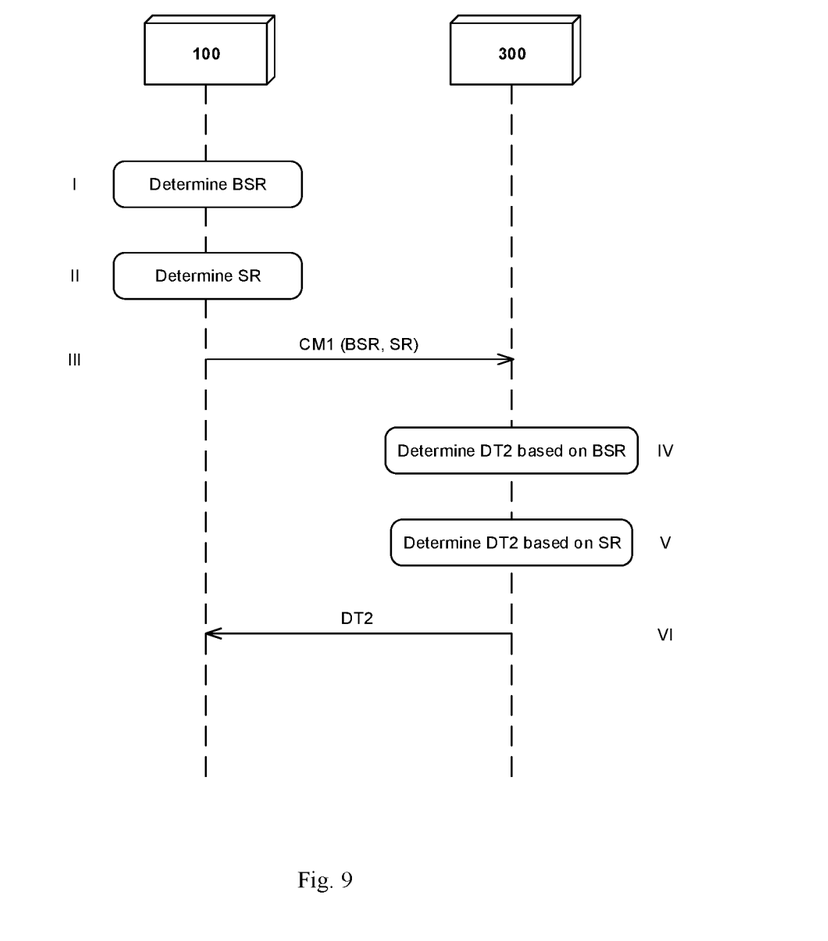
FIG. 9 shows a flow chart according to an exemplary embodiment of the invention.

According to an exemplary embodiment, the first control message CM1 is used by the client device 100 to send a transmission buffer status report BSR and/or a scheduling request SR. This is beneficial for bursty data traffic and allows the network node 300 to optimize UL resources for the client devices 100a, 100b, ..., 100n. FIG. 9 shows such an embodiment. In step 1 in FIG. 9, the client device 100 determines a transmission buffer status report BSR of the client device 100. In a similar way, the client device 100 determines a scheduling request SR for the client device 100 in step II in FIG. 9. The determined transmission buffer status report BSR and/or scheduling request SR are included in the first control message CM1 transmitted by the client device 100 in step III in FIG. 9. Hence, the first control message CM1 transmitted by the client device 100 and received by the network node 300 in step III may comprise the transmission buffer status report BSR of the client device 100, and/or the scheduling request SR for the client device 100. In addition, information such as CSI for UL transmission may also be included by the client device 100 in the first control message CM1.

In step IV in FIG. 9 the network node 300 determines/configures/prepares the second data transmission DT2 based on the transmission buffer status report BSR of the client device 100. In a similar way, the network node 300 determines/configures/prepares the second data transmission DT2 based on the scheduling request SR for the client device 100 in step V in FIG. 9. Finally, in step VI in FIG. 9 the network node 300 transmits the second data transmission DT2 determined based on the transmission buffer status report BSR and/or the scheduling request SR to the client device 100.

Effects of embodiments of the invention can e.g. be seen in decreased transmission errors, for example in terms of block error rate (BLER), and improved user throughputs in wireless communication systems. Also, much quicker adaptation to rapid changes in interference can be achieved with embodiments of the invention. It is realized that embodiments of the invention can have further advantageous effects.

The client device 100 herein may be denoted as a user device, a User Equipment (UE), a mobile station, an internet of things (IoT) device, a sensor device, a wireless terminal and/or a mobile terminal, is enabled to communicate wirelessly in a wireless communication system, sometimes also referred to as a cellular radio system. The UEs may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network node 300 herein may also be denoted as a radio network node, an access network node, an access point, or a base station, e.g. a Radio Base Station (RBS), which in some networks may be referred to as transmitter, "eNB", "eNodeB", "NodeB" or "B node", depending on the technology and terminology used. The radio network nodes may be of different classes such as e.g. macro eNodeB, home eNodeB or pico base station, based on transmission power and thereby also cell size. The radio network node can be a Station (STA), which is any device that contains an IEEE 802.11-conformant Media Access Control (MAC) and Physical Layer (PHY) interface to the Wireless Medium (WM). The radio network node may also be a base station corresponding to the fifth generation (5G) wireless systems.

Furthermore, any method according to embodiments of the invention may be implemented in a computer program, having code means, which when run by processing means causes the processing means to execute the steps of the method. The computer program is included in a computer readable medium of a computer program product. The computer readable medium may comprises essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person that embodiments of the client device 100 and the network node 300 comprises the necessary communication capabilities in the form of e.g., functions, means, units, elements, etc., for performing the present solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc. which are suitably arranged together for performing the present solution.

Especially, the processor(s) of the client device 100 and the network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, e.g., any, some or all of the ones mentioned above. The processing circuitry may further perform data processing functions for inputting, outputting, and processing of data comprising data buffering and device control functions, such as call processing control, user interface control, or the like.

Finally, it should be understood that the present invention is not limited to the exemplary embodiments described above, but also relates to and incorporates all embodiments within the scope of the appended independent claims.

What is claimed is:

1. A client device for a wireless communication system, the client device comprising:
   a non-transitory memory, configured to store a program code; and
   a processor, wherein when the program code runs in the processor, the processor is caused to:
      receive an indication of a first network signal-to-interference-plus-noise ratio (SINR) for a first data transmission (DT1) from a network node;
      derive the first network SINR based on the indication of the first network SINR;
      estimate an adjusted SINR for a second data transmission (DT2) from the network node;
   compute a SINR difference value between the first network SINR and the estimated adjusted SINR; and
   output at least one first control message (CM1), the CM1 comprising an indication of an SINR adjustment for the estimated adjusted SINR to the network node in a case where the SINR difference value is larger than a threshold value, wherein the threshold value is a predetermined minimum allowed difference between the first network SINR and the estimated adjusted SINR.

2. The client device according to claim 1, wherein when the program code runs in the processor, the processor is caused to:
   receive the DT1 from the network node;
   determine a decoding process outcome for the DT1 based on the indication of the first network SINR; and
   output the CM1 based upon the SINR difference value being larger than the threshold value and based upon the decoding process outcome being a decoding error or a decoding success.

3. The client device according to claim 1, wherein when the program code runs in the processor, the processor is caused to:
   output the CM1 in a contention based access channel (CBAC).

4. The client device according to claim 3, wherein when the program code runs in the processor, the processor is caused to:
   receive a second control message (CM2) from the network node, wherein the CM2 comprises a channel access configuration for the CBAC; and
   output the CM1 in the CBAC according to the channel access configuration.

5. The client device according to claim 4,
   wherein the CM2 further comprises a valid access time period for the CBAC, and
   wherein, when the program code runs in the processor, the processor is caused to: access the CBAC during the valid access time period.

6. The client device according to claim 4,
   wherein the CM2 further comprises a priority level, and
   wherein, when the program code runs in the processor, the processor is caused to: use the priority level in a back-off collision scheme when accessing the CBAC.

7. The client device according to claim 4, wherein the CM2 further comprises the threshold value.

8. The client device according to claim 3, wherein when the program code runs in the processor, the processor is caused to: output payload data to the network node in the CBAC.

9. The client device according to claim 1, the client device being configured to determine a transmission buffer status report (BSR) of the client device, wherein the CM1 further comprises the transmission BSR.

10. The client device according to claim 1, the client device being configured to determine a scheduling request (SR) for the client device, wherein the CM1 further comprises the SR.

11. A method for operating a client device for a wireless communication system, the method comprising:
   receiving an indication of a first network signal-to-interference-plus-noise ratio (SINR) for a first data transmission (DT1) from a network node;
   deriving the first network SINR based on the indication of the first network SINR;
   estimating an adjusted SINR for a second data transmission (DT2) from the network node;
   computing a SINR difference value between the first network SINR and the estimated adjusted SINR; and
   outputting at least one first control message (CM1), the CM1 comprising an indication of an SINR adjustment for the estimated adjusted SINR to the network node in a case where the SINR difference value is larger than a threshold value, wherein the threshold value is a predetermined minimum allowed difference between the first network SINR and the estimated adjusted SINR.

12. The method according to claim 11, the method further comprising:
   receiving the DT1 from the network node;
   determining a decoding process outcome for the DT1 based on the indication of the first network SINR;
   outputting the CM1 based upon the SINR difference value being larger than the threshold value and based upon the decoding process outcome being a decoding error or a decoding success.

13. The method according to claim 11, wherein the transmitting of the first control message comprises:
   outputting the CM1 in a contention based access channel (CBAC).

14. The method according to claim 13, the method further comprising:
   receiving a second control message (CM2) from the network node, wherein the CM2 comprises a channel access configuration for the CBAC; and
   outputting the CM1 in the CBAC according to the channel access configuration.

15. The method according to claim 14,
   wherein the CM2 further comprises a valid access time period for the CBAC, and wherein the method further comprises accessing the CBAC during the valid access time period.

16. The method according to claim 14,
wherein the CM2 further comprises a priority level, and
wherein the method further comprises using the priority level in a back-off collision scheme when accessing the CBAC.

17. The method according to claim 14, wherein the CM2 further comprises the threshold value.

18. The method according to claim 13, the method further comprising:
outputting payload data to the network node in the CBAC.

19. The method according to claim 11, the method further comprising determining a transmission buffer status report (BSR) of the client device, wherein the CM1 further comprises the transmission BSR.

20. The method according to claim 11, the method further comprising: determining a scheduling request (SR) for the client device, wherein the CM1 further comprises the SR.

* * * * *